United States Patent
Shinohara

(10) Patent No.: US 9,998,061 B2
(45) Date of Patent: Jun. 12, 2018

(54) MOTOR CONTROL DEVICE AND MOTOR CONTROL METHOD

(71) Applicant: Mitsubishi Electric Corporation, Tokyo (JP)

(72) Inventor: Ryo Shinohara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days. days.

(21) Appl. No.: 15/427,149

(22) Filed: Feb. 8, 2017

(65) Prior Publication Data

US 2017/0237381 A1    Aug. 17, 2017

(30) Foreign Application Priority Data

Feb. 16, 2016    (JP) .................................. 2016-026675

(51) Int. Cl.
*H02P 27/06*    (2006.01)
*H02P 29/024*    (2016.01)
*H02P 6/17*    (2016.01)

(52) U.S. Cl.
CPC .............. *H02P 29/024* (2013.01); *H02P 6/17* (2016.02); *H02P 27/06* (2013.01)

(58) Field of Classification Search
CPC .................................................. H02P 29/024
USPC .................. 318/400.27, 400.26, 400.01, 700
See application file for complete search history.

(56) References Cited

U.S. PATENT DOCUMENTS 7,095,206 B2 *    8/2006    Lequesne ............. H02H 7/0833
                                                     318/254.1

FOREIGN PATENT DOCUMENTS

| JP | 09-047055 A | 2/1997 |
| JP | 2002-17098 A | 1/2002 |
| JP | 2006-320134 A | 11/2006 |
| JP | 2010-110099 A | 5/2010 |
| JP | 2012-196104 A | 10/2012 |
| WO | 2015/011941 A1 | 1/2015 |

OTHER PUBLICATIONS

Communication dated Jan. 24, 2017 from the Japanese Patent Office in counterpart application No. 2016-026675.

* cited by examiner

*Primary Examiner* — David S Luo
(74) *Attorney, Agent, or Firm* — Sughrue Mion, PLLC; Richard C. Turner

(57) ABSTRACT

A switching control unit that ON/OFF-controls switching elements of a power conversion circuit includes a power supply side abnormality determination unit, and a regeneration abnormality response processing selection unit that selects either three-phase short circuit processing, in which all upper stage side switching elements or all lower stage side switching elements are switched ON, or six-switch opening processing, in which all of the switching elements of the power conversion circuit are switched OFF, as processing to be executed when the power supply side abnormality determination unit determines that a power supply side abnormality has occurred, the three-phase short circuit processing and the six-switch opening processing being selected in accordance with a motor operating condition of the AC motor at the time of the determination.

15 Claims, 3 Drawing Sheets

MOTOR CONTROL DEVICE AND MOTOR CONTROL METHOD

BACKGROUND OF THE INVENTION

1. Field of the Invention

This invention relates to a motor control device and a motor control method for drive-controlling an AC motor.

2. Description of the Related Art

An electric vehicle having an AC motor as a driving force source is available in the prior art. In this electric vehicle, traveling drive torque is generated during travel by having the AC motor perform a power running operation, and regenerative braking torque is generated during braking by having the AC motor perform a regenerative operation.

Here, a driving system of the electric vehicle is constituted by a DC power supply, which is constituted by a secondary battery such as a lithium ion battery, an inverter circuit that is connected to the DC power supply and includes a capacitor and a plurality of semiconductor switches, and the AC motor, which is connected to the inverter circuit as a load.

The inverter circuit converts DC power from the DC power supply into predetermined AC power by switching the plurality of semiconductor switches ON and OFF at predetermined switching frequencies, and in so doing adjusts a torque and a rotation speed of the AC motor serving as the load. Further, depending on the operating condition thereof, the AC motor operates as a power generator so as to charge regenerative power generated by power generation to the DC power supply. Note that a highly efficient permanent magnet three-phase synchronous motor is often used as an AC motor applied to an electric vehicle.

In a driving system employing a three-phase synchronous motor, the inverter circuit is constructed by connecting three series circuits, each of which is configured such that an upper stage side switching element and a lower stage side switching element are connected in series, in parallel to the DC power supply. Further, respective midpoints of the three series circuits are connected to respective inputs of a U phase, a V phase, and a W phase of the three-phase synchronous motor.

Furthermore, by switching the switching elements provided in the respective phases of the inverter circuit ON and OFF in sequence, AC power is supplied to the respective phases of the three-phase synchronous motor at phases differing from each other by 120 degrees, and as a result, the three-phase synchronous motor is driven. Unless specified otherwise, it is assumed hereafter that the term "motor" denotes a three-phase synchronous motor. Note that operating principles of the inverter circuit are widely known, and will not therefore be described here.

Here, to protect the battery serving as the DC power supply from an overvoltage and an overcurrent, the driving system of the electric vehicle is provided with opening/closing means for disconnecting the battery from the inverter circuit as required. A condition for opening the opening/closing means is satisfied when a voltage of the battery equals or exceeds a predetermined value during a regenerative operation by the motor, when the battery voltage falls to or below a predetermined value due to battery wear, when a current flowing through the battery equals or exceeds a predetermined value, and so on. The opening/closing means may also be opened due to a fault in the vehicle, a collision, and so on.

In this driving system, the opening/closing means may be opened such that the inverter circuit is disconnected from the battery during the regenerative operation performed by the motor. Moreover, the inverter circuit may be disconnected from the battery even in a driving system not provided with the opening/closing means when a power line between the battery and the inverter circuit is cut.

In this case, the regenerative power flowing into the inverter circuit from the motor cannot be charged to the battery, and is charged to the capacitor of the inverter circuit instead. As a result, an overvoltage may be exerted on the capacitor, causing the capacitor to break.

Hence, when the inverter circuit is disconnected from the battery, six-switch opening processing may be executed to stop the inverter operation by switching all of the semiconductor switches of the inverter circuit OFF. When this six-switch opening processing is executed, however, power stored in a stator coil of the motor is charged to the capacitor via freewheel diodes (FWD) connected in reverse parallel to the switching elements, and as a result, an inter-terminal voltage of the capacitor may increase rapidly.

When, at this time, a capacitance and a voltage resistance of the capacitor are increased in order to cope with an increase in the inter-terminal voltage of the capacitor, the capacitor increases in size. Moreover, when the voltage resistance of the capacitor is increased, the voltage resistances of the respective constituent components of the inverter circuit must also be increased, making it difficult to achieve reductions in the size and cost of the inverter circuit. An inability to reduce the size of the inverter circuit is a particularly serious problem for an inverter circuit used in an electric vehicle, which must be installed in a limited space inside a vehicle.

Hence, to solve the problems described above, a method of adding a discharge circuit that consumes the regenerative power flowing into the inverter circuit from the motor by means of heat generation so that excessive regenerative power flowing into a capacitor is consumed by the discharge circuit has been proposed (see Japanese Patent Application Publication No. 2010-110099, for example).

A method of ensuring that power is not regenerated to the capacitor by executing three-phase short circuit processing, in which the respective phases of the motor are mutually short-circuited by switching all of the upper stage side switching elements or all of the lower stage side switching elements of the inverter circuit ON, when the inverter circuit is disconnected from the DC power supply instead of the six-switch opening processing has also been proposed (see Japanese Patent Application Publication No. H9-47055, for example).

SUMMARY OF THE INVENTION

As described above, when the inverter operation is stopped by switching all of the semiconductor switches of the inverter circuit OFF in a case where the inverter circuit has been disconnected from the DC power supply, the inter-terminal voltage of the capacitor may increase rapidly, and therefore, to cope with this rapid increase, it is necessary to increase the capacitance and voltage resistance of the capacitor. As a result, the size of the capacitor increases, making it difficult to achieve reductions in the size and cost of the inverter circuit.

With the method disclosed in Japanese Patent Application Publication No. 2010-110099 in response to this problem, an increase in the inter-terminal voltage of the capacitor can be suppressed, but the size of the inverter circuit increases due to the addition of the discharge circuit. In particular, when the amount of regenerative power that must be consumed by the discharge circuit is large, the discharge circuit must be constructed using elements having a superior power handling capacity, and as a result, increases occur in the circuit scale and cost of the inverter circuit.

Further, with the method disclosed in Japanese Patent Application Publication No. H9-47055, an increase in the inter-terminal voltage of the capacitor can be suppressed, but the currents passed through the respective phases in order to drive the motor up to that point may increase momentarily so as to exceed respective withstand currents of the switching elements and the motor, and as a result, the switching elements and the motor may break.

This invention has been designed to solve the problems described above, and an object thereof is to obtain a small, low-cost motor control device with which an increase in an inter-terminal voltage of a capacitor and an increase in phase currents passed through respective phases of a motor can be suppressed even when an inverter circuit is disconnected from a DC power supply, thereby preventing the inverter circuit and the motor from breaking.

A motor control device according to this invention is connected between a DC power supply and an AC motor in order to drive-control the AC motor by converting DC power from the DC power supply into AC power, and includes a power conversion circuit in which an arm of one AC phase is constituted by a series circuit having an upper stage side switching element and a lower stage side switching element, a capacitor that smooths a DC side voltage of the power conversion circuit, and a switching control unit that ON/OFF-controls the switching elements of the power conversion circuit, the switching control unit including: a power supply side abnormality determination unit that determines whether or not a power supply side abnormality in which regenerative power from the AC motor cannot be regenerated to the DC power supply has occurred; and a regeneration abnormality response processing selection unit that selects either three-phase short circuit processing, in which all of the upper stage side switching elements or all of the lower stage side switching elements are switched ON, or six-switch opening processing, in which all of the switching elements of the power conversion circuit are switched OFF, as processing to be executed when the power supply side abnormality determination unit determines that a power supply side abnormality has occurred, the three-phase short circuit processing and the six-switch opening processing being selected in accordance with a motor operating condition of the AC motor at the time of the determination.

In the motor control device according to this invention, the switching control unit that ON/OFF-controls the switching elements of the power conversion circuit includes the power supply side abnormality determination unit for determining whether or not a power supply side abnormality in which regenerative power from the AC motor cannot be regenerated to the DC power supply has occurred, and the regeneration abnormality response processing selection unit for selecting either the three-phase short circuit processing, in which all of the upper stage side switching elements or all of the lower stage side switching elements are switched ON, or the six-switch opening processing, in which all of the switching elements of the power conversion circuit are switched OFF, as the processing to be executed when the power supply side abnormality determination unit determines that a power supply side abnormality has occurred, the three-phase short circuit processing and the six-switch opening processing being selected in accordance with the motor operating condition of the AC motor at the time of the determination.

As a result, it is possible to obtain a small, low-cost motor control device with which an increase in an inter-terminal voltage of a capacitor and an increase in phase currents passed through respective phases of a motor can be suppressed even when an inverter circuit is disconnected from a DC power supply, thereby preventing the inverter circuit and the motor from breaking.

DESCRIPTION OF THE PREFERRED EMBODIMENTS

Figure 1:
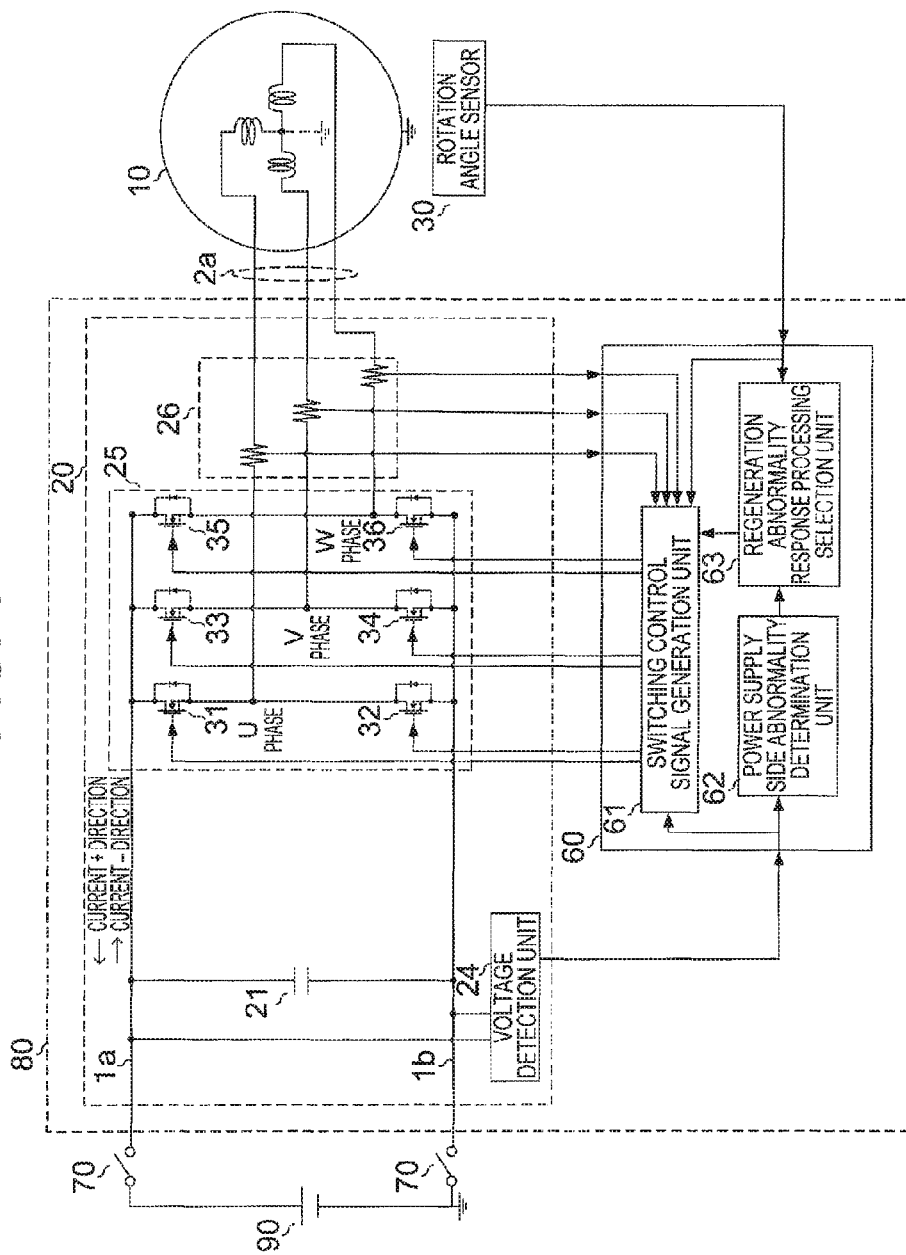
FIG. 1 is a block diagram showing a configuration of a driving system installed with a motor control device according to a first embodiment of this invention.

Preferred embodiments of a motor control device and a motor control method according to this invention will be described below using the drawings. Note that identical or corresponding parts of the drawings will be described using identical reference numerals.

An electric motor, also known simply as a motor, typically performs a power running operation by converting electric power into driving force, but is also capable of performing a regenerative operation by converting driving force back into electric power without the need for structural modifications. Further, a power generator, also known simply as a generator, performs a regenerative operation by converting driving force into electric power, but is also capable of performing a power running operation by converting electric power back into driving force without the need for structural modifications.

In other words, an electric motor and a power generator have basically identical structures, and both are capable of a power running operation and a regenerative operation. In this specification, therefore, a rotating electric machine capable of functioning as both an electric motor and a power generator will be referred to simply as a motor.

First Embodiment

A motor control device according to a first embodiment of this invention will be described in detail below on the basis of FIGS. 1 and 2. FIG. 1 is a block diagram showing a configuration of a driving system installed with the motor control device according to the first embodiment of this invention. FIG. 1 also shows a DC power supply such as a battery, which supplies DC power to an inverter circuit and is charged with regenerative power, and a three-phase synchronous motor serving as a control subject.

In FIG. 1, a motor control device 80 is connected to a DC power supply 90 by DC buses 1a, 1b via a power switch 70 so as to exchange driving power and regenerative power with the DC power supply 90. Further, the motor control device 80 is connected to a motor 10 by an AC bus 2*a* so as to exchange driving power and regenerative power with the motor 10.

Furthermore, a rotation angle sensor 30 is provided on the motor 10 to detect a rotation angle of the motor. Note that a motor that drives a load to rotate and is capable of regenerating rotational energy from the load as electric energy, such as a permanent magnet three-phase AC synchronous motor or a three-phase brushless motor, for example, is used as the motor 10.

Further, the motor control device 80 is constituted by an inverter circuit 20 and a switching control unit 60. The inverter circuit 20 includes a capacitor 21 connected between the DC buses 1*a*, 1*b* on a power supply input side, a voltage detection unit 24 that detects a DC bus voltage of the inverter circuit 20, a power conversion circuit 25 that is formed from a plurality of switching elements and performs DC/AC power conversion, and a motor current detection unit 26 that detects a current of the motor 10, which flows through the AC bus 2*a*.

The capacitor 21 has a function for suppressing a ripple in the DC bus voltage, a function for improving the AC current driving ability of the inverter circuit 20 by reducing a source impedance of the inverter circuit 20, a function for absorbing a surge voltage, and so on. Further, the voltage detection unit 24 divides the DC bus voltage using a voltage dividing resistor or the like into voltages that can be read by the switching control unit 60, and outputs DC bus voltage information to the switching control unit 60.

The power conversion circuit 25 is a typical, well-known inverter in which six switching elements are connected in a full bridge configuration. More specifically, as shown in FIG. 1, switching elements 31, 32, switching elements 33, 34, and switching elements 35, 36 are respectively connected to each other in series and connected in parallel to the DC power supply 90.

Furthermore, a midpoint between the switching elements 31, 32 is connected to a U phase input of the motor 10, a midpoint between the switching elements 33, 34 is connected to a V phase input of the motor 10, and a midpoint between the switching elements 35, 36 is connected to a W phase input of the motor 10.

Here, the switching elements 31, 33, 35 connected to a positive electrode side of the DC power supply 90, or in other words the DC bus 1*a*, will be referred to as upper stage side switching elements, and the switching elements 32, 34, 36 connected to a negative electrode side of the DC power supply, or in other words the DC bus 1*b*, will be referred to as lower stage side switching elements.

As shown in FIG. 1, for example, metal oxide semiconductor field effect transistors (MOSFETs), or instead of MOSFETs insulated gate bipolar transistors (IGBTs) or the like, are used as the switching elements.

Note that a freewheel diode (FWD) in which a direction heading from the negative electrode side toward the positive electrode side of the DC power supply 90, or in other words from the lower stage side toward the upper stage side, is set as a forward direction is provided in parallel with each of the MOSFETs forming the switching elements.

The motor current detection unit 26 detects a motor current flowing through the AC bus 2*a*, converts the detected current into a voltage, and outputs motor current information to the switching control unit 60. FIG. 1 shows a configuration in which the current is detected by a shunt resistor. Note that the motor current detection unit 26 may be a current sensor that uses a Hall element or the like.

The power switch 70 controls power exchange between the DC power supply 90 and the motor control device 80. More specifically, the power switch 70 is controlled to an open condition by an upper order system, not shown in the drawings, when a voltage of the DC power supply 90 equals or exceeds a set value during a regenerative operation by the motor 10, when the voltage of the DC power supply 90 falls to or below a set value due to wear on the DC power supply 90 or the like, when the current flowing through the DC power supply 90 equals or exceeds a set value, when a breakdown or a collision is detected in the vehicle, and so on. Note that the power switch 70 may be configured so as to be controlled by the switching control unit 60.

Further, the rotation angle sensor 30 detects a rotor rotation angle of the motor 10 using a resolver, an encoder, or the like. The rotor rotation angle detected by the rotation angle sensor 30 is output to the switching control unit 60.

The switching control unit 60 is responsible for controlling the entire motor control device, and is constituted by a microcontroller, a drive circuit, and so on. The switching control unit 60 includes a switching control signal generation unit 61, a power supply side abnormality determination unit 62, and a regeneration abnormality response processing selection unit 63.

The switching control signal generation unit 61 generates ON/OFF control signals for ON/OFF-controlling the plurality of switching elements constituting the power conversion circuit 25. Further, the power supply side abnormality determination unit 62 determines whether or not a power supply side abnormality in which regenerative power from the motor 10 cannot be regenerated to the DC power supply 90 has occurred.

When the power supply side abnormality determination unit 62 determines that a power supply side abnormality has occurred, the regeneration abnormality response processing selection unit 63 selects either three-phase short circuit processing, in which all of the upper stage side switching elements or all of the lower stage side switching elements of the power conversion circuit 25 are switched ON, or six-switch opening processing, in which all of the switching elements of the power conversion circuit 25 are switched OFF, as processing to be executed in accordance with the motor operating condition of the motor 10 at the time of the determination.

More specifically, the power supply side abnormality determination unit 62 determines whether or not a power supply side abnormality has occurred on the basis of the DC bus voltage information input from the voltage detection unit 24, and outputs a determination result to the regeneration abnormality response processing selection unit 63.

Further, the regeneration abnormality response processing selection unit 63 receives information indicating the rotation angle of the motor 10 from the rotation angle sensor 30 and the power supply side abnormality determination result from the power supply side abnormality determination unit 62, and having determined from this input information that a power supply side abnormality has occurred, selects either the three-phase short circuit processing or the six-switch opening processing, and outputs the selection result to the switching control signal generation unit 61 in the form of a regeneration abnormality response processing command.

The switching control signal generation unit 61 receives the DC bus voltage information from the voltage detection unit 24, the information indicating the rotation angle of the motor 10 from the rotation angle sensor 30, the motor current information from the motor current detection unit 26, and the regeneration abnormality response processing command from the regeneration abnormality response processing selection unit 63, calculates an ON/OFF control signal for each of the switching elements of the power conversion circuit 25 in accordance with the input information as well as a torque command value and a current command value input from the outside in relation to the motor 10, and outputs the ON/OFF control signals to the power conversion circuit 25.

The switching elements 31 to 36 respectively perform ON/OFF operations in response to the ON/OFF control signals from the switching control signal generation unit 61, whereupon DC power is converted into AC power and supplied thus to the motor 10, and when the motor 10 is in a regenerative condition, regenerative power generated is charged to the DC power supply 90.

Here, a feature of the motor control device according to the first embodiment of this invention is that the switching control unit 60 is provided with the regeneration abnormality response processing selection unit 63 so that when a power supply side abnormality is determined to have occurred, either the three-phase short circuit processing or the six-switch opening processing is selected and executed on the basis of the information indicating the rotation angle of the motor 10.

With this configuration, an increase in an inter-terminal voltage of the capacitor and an increase in the phase currents of the motor 10 can both be suppressed even when the inverter circuit 20 is disconnected from the DC power supply 90. This configuration will be described in more detail below together with reasons why an increase in the inter-terminal voltage of the capacitor and an increase in the phase currents of the motor 10 can both be suppressed thereby.

As described above, when, during a regenerative operation by the motor 10, the power switch 70 is opened or a power line between the DC power supply 90 and the inverter circuit 20 is cut so that the inverter circuit 20 is disconnected from the DC power supply 90, the regenerative power flowing into the inverter circuit 20 from the motor 10 cannot be charged to the DC power supply 90, and is charged to the capacitor 21 of the inverter circuit 20 instead. As a result, an overvoltage may be exerted on the capacitor 21, causing the capacitor 21 to break.

In response to this problem, a method of executing six-switch opening processing in order to stop the inverter operation may be employed. When six-switch opening processing is executed, however, power stored in a stator coil of the motor 10 is charged to the capacitor 21 via the freewheel diodes (FWD) connected in reverse parallel to the switching elements, and as a result, the inter-terminal voltage of the capacitor 21 may increase rapidly.

Note that the increase in the inter-terminal voltage of the capacitor 21 tends to become steadily greater as a rotation speed of motor 10 increases. More specifically, an induction voltage of the motor 10 has a proportional relationship to the rotation speed such that the induction voltage of the motor 10 increases as the rotation speed increases, and therefore the regenerative power charged to the capacitor 21, which is derived from the induction voltage, increases as the rotation speed increases, causing the increase in the inter-terminal voltage of the capacitor 21 to become greater.

Meanwhile, in another method, three-phase short circuit processing, in which the respective phases of the motor 10 are mutually short-circuited by switching all of the upper stage side switching elements or all of the lower stage side switching elements of the inverter circuit 20 ON, is executed to ensure that power is not regenerated to the capacitor 21.

When three-phase short circuit processing is executed, however, the respective phases of the motor 10 remain connected to each other via small resistance values, and therefore the phase currents flowing through the respective phases increase momentarily.

Here, the inventor of the present application discovered in an experiment that maximum values of the increased phase currents following the three-phase short circuit processing vary in accordance with the rotation speed of the motor 10 such that the maximum values of the increased phase currents following the three-phase short circuit processing become steadily larger as the rotation speed decreases.

Figure 2:
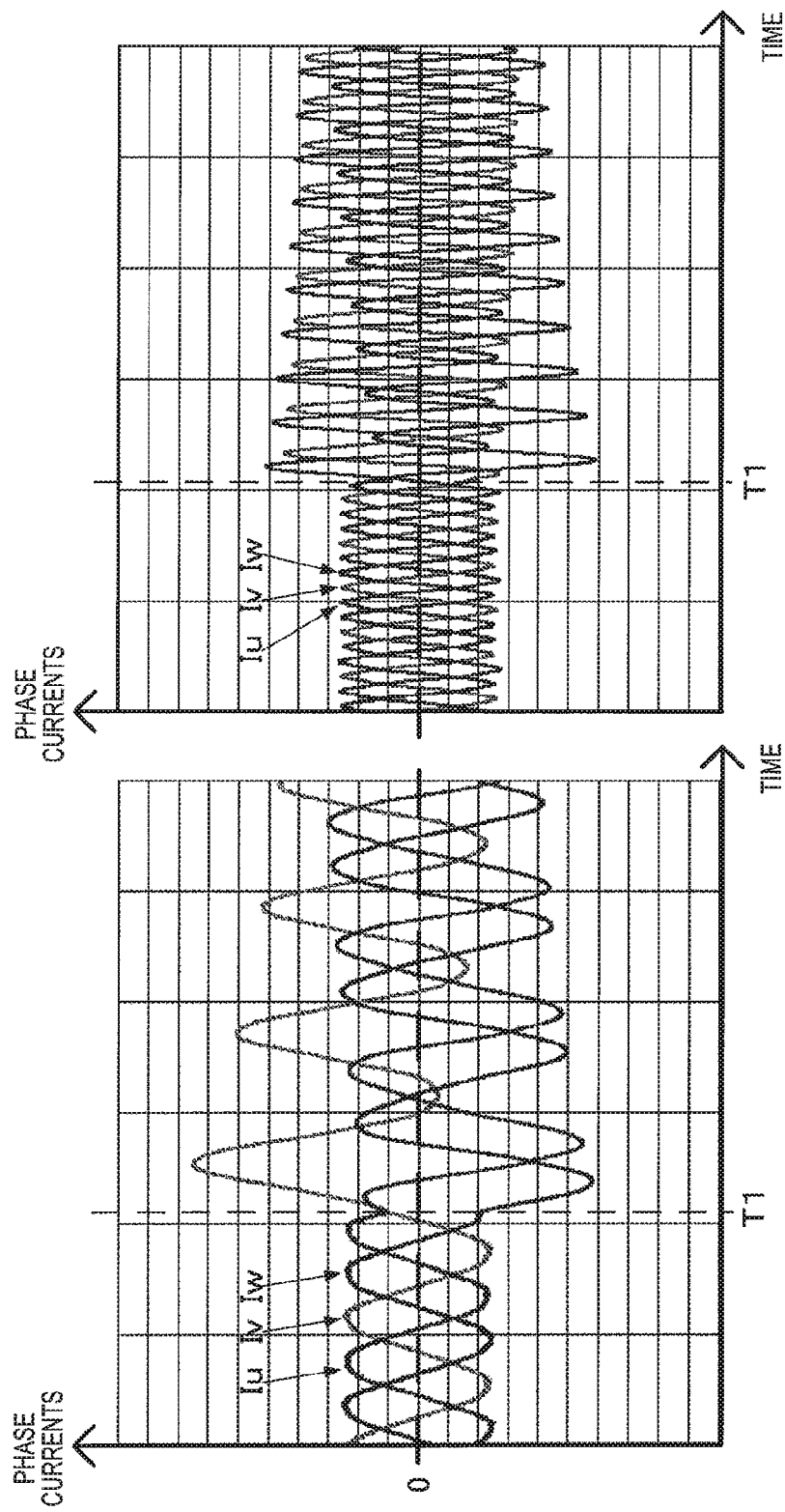
FIGS. 2A and 2B are illustrative views showing waveforms measured during an experiment in order to illustrate a dependence relationship between maximum values of phase currents following three-phase short circuit processing and a rotation speed of a motor in the motor control device according to the first embodiment of this invention.

FIG. 2 is an illustrative views showing waveforms measured during the experiment in order to illustrate a dependence relationship between the maximum values of the phase currents following the three-phase short circuit processing and the rotation speed of the motor in the motor control device according to the first embodiment of this invention. More specifically, FIG. 2 shows results obtained by measuring the waveforms of the phase currents flowing through the motor 10 when the motor 10 is subjected to the three-phase short circuit processing during a regenerative operation.

In FIGS. 2A and 2B, the magnitudes of the phase currents are identical prior to execution of the three-phase short circuit processing. As regards the rotation speed of the motor 10, meanwhile, regenerative driving is performed in a lower rotation speed condition in FIG. 2A than in FIG. 2B. In both FIG. 2A and FIG. 2B, the three-phase short circuit processing is executed at a time T1. When the magnitudes, and in particular the maximum values, of the phase currents following the three-phase short circuit processing are compared in FIGS. 2A and 2B, it is evident that the maximum values are larger in FIG. 2A, i.e. when the rotation speed is lower.

Hence, when the rotation speed of the motor 10 is high, the increase in the inter-terminal voltage of the capacitor upon execution of the six-switch opening processing becomes greater, but the maximum values of the phase currents upon execution of the three-phase short circuit processing decrease. When the rotation speed of the motor 10 is low, on the other hand, the increase in the inter-terminal voltage of the capacitor upon execution of the six-switch opening processing becomes smaller, but the maximum values of the phase currents upon execution of the three-phase short circuit processing increase.

Therefore, in the motor control device according to the first embodiment of this invention, as described above, the regeneration abnormality response processing selection unit 63 receives the information indicating the rotation angle of the motor 10 from the rotation angle sensor 30 and the power supply side abnormality determination result from the power supply side abnormality determination unit 62, and having determined from this input information that a power supply side abnormality has occurred, selects either the three-phase short circuit processing or the six-switch opening processing, and outputs the selection result to the switching control signal generation unit 61 in the form of a regeneration abnormality response processing command.

More specifically, having determined that a power supply side abnormality has occurred, the regeneration abnormality response processing selection unit 63 selects the six-switch opening processing when the rotation speed of the motor 10, which is calculated from the rotation angle information, is lower than a three-phase short circuit execution rotation speed, and selects the three-phase short circuit processing when the rotation speed of the motor 10 is higher than the three-phase short circuit execution rotation speed.

Here, the three-phase short circuit execution rotation speed is set at a lower limit value of a rotation speed at which the maximum values of the phase currents, which increase upon execution of the three-phase short circuit processing, fall below an overcurrent threshold. Further, the overcurrent threshold is set at a current value not exceeding withstand currents of the motor 10 and the constituent components of the inverter circuit, or in other words in a similar manner to a typical motor control device.

Moreover, the capacitor 21 is selected so that a maximum value of the capacitor inter-terminal voltage, which increases when the six-switch opening processing is executed at the three-phase short circuit execution rotation speed, falls below an overvoltage threshold. The overvoltage threshold is set at a voltage value not exceeding withstand voltages of the capacitor 21 and the constituent components of the inverter circuit, or in other words in a similar manner to a typical motor control device.

When a regeneration abnormality response processing command indicating the three-phase short circuit processing or the six-switch opening processing is not input into the switching control signal generation unit 61 from the regeneration abnormality response processing selection unit 63, the switching control signal generation unit 61 executes typical, widely known inverter circuit drive control.

Briefly, a target torque and a target current of the motor 10 are input from another control device such as a vehicle ECU, not shown in the drawings, via a controller area network (CAN) or the like, whereupon current feedback control is executed using the DC bus voltage information input from the voltage detection unit 24, the information indicating the rotation angle of the motor 10, input from the rotation angle sensor 30, and the motor current information input from the motor current detection unit 26. ON/OFF control signals for the respective switching elements of the power conversion circuit 25 are then calculated so as to obtain the target torque and the target current of the motor 10, whereupon the ON/OFF control signals are output to the power conversion circuit 25. Note that the current feedback control is well known, and therefore detailed description thereof has been omitted here.

When the three-phase short circuit processing is input into the switching control signal generation unit 61 from the regeneration abnormality response processing selection unit 63 as the regeneration abnormality response processing command, on the other hand, the switching control signal generation unit 61 outputs ON/OFF control signals to the power conversion circuit 25 so that the upper stage side switching elements 31, 33, 35 are switched ON and the lower stage side switching elements 32, 34, 36 are switched OFF.

Note that when the three-phase short circuit processing is input into the switching control signal generation unit 61 from the regeneration abnormality response processing selection unit 63 as the regeneration abnormality response processing command, the switching control signal generation unit 61 may output ON/OFF control signals to the power conversion circuit 25 so that the upper stage side switching elements 31, 33, 35 are switched OFF and the lower stage side switching elements 32, 34, 36 are switched ON.

Further, when the six-switch opening processing is input into the switching control signal generation unit 61 from the regeneration abnormality response processing selection unit 63 as the regeneration abnormality response processing command, the switching control signal generation unit 61 outputs ON/OFF control signals to the power conversion circuit 25 so that all of the switching elements 31 to 36 are switched OFF.

According to this configuration, the six-switch opening processing is implemented in a motor operating condition in which the rotation speed of the motor 10 is low such that the maximum values of the phase currents would increase to the extent that the motor 10 and the constituent components of the inverter circuit may break upon execution of the three-phase short circuit processing. As a result, breakage of the motor 10 and the constituent components of the inverter circuit due to increased phase currents resulting from execution of the three-phase short circuit processing can be prevented.

Further, in a motor operating condition in which the rotation speed of motor 10 is high such that a large amount of regenerative energy would flow into the capacitor 21 upon execution of the six-switch opening processing, the three-phase short circuit processing is implemented. As a result, breakage of the capacitor 21 and the constituent components of the inverter circuit due to an increased capacitor inter-terminal voltage resulting from execution of the six-switch opening processing can be prevented.

In other words, the motor operating condition in which the six-switch opening processing is executed is limited to a motor operating condition in which the rotation speed of the motor 10 is low enough to ensure that a small amount of regenerative energy flows into the capacitor 21, and therefore the capacitance of the capacitor need only be large enough to withstand a comparatively small amount of inflowing regenerative energy. As a result, a small capacitor can be used.

Next, an operation of the motor control device according to the first embodiment of this invention will be described. First, the power supply side abnormality determination unit 62 determines on the basis of the DC bus voltage input from the voltage detection unit 24 whether or not a power supply side abnormality in which regenerative power cannot be regenerated to the DC power supply 90 has occurred. More specifically, the power supply side abnormality determination unit 62 determines that a power supply side abnormality in which regenerative power cannot be regenerated to the DC power supply 90 has occurred when the DC bus voltage equals or exceeds a predetermined set value, and determines that the power supply side is normal in all other cases.

In so doing, it is possible to determine that a power supply side abnormality has occurred in cases where regenerative power cannot be regenerated to the DC power supply 90, such as a case in which the motor 10 performs a regenerative operation while the power switch 70 is in an open condition such that regenerative power is stored in the capacitor 21, with the result that an end-to-end voltage of the capacitor 21, or in other words the DC bus voltage, reaches a high voltage that would not occur during a normal operation, or a case in which the DC power supply 90 reaches a high voltage that would not occur during a normal operation even though the power switch 70 is in a conductive condition.

When the power supply side abnormality determination unit 62 determines that the power supply side is normal, the motor 10 can perform the power running operation and the regenerative operation without any problems, and therefore the regeneration abnormality response processing selection unit 63 does not output a regeneration abnormality response processing command to the switching control signal generation unit 61. When a regeneration abnormality response processing command is not input into the switching control signal generation unit 61 from the regeneration abnormality response processing selection unit 63, the switching control signal generation unit 61 executes typical, widely known inverter circuit drive control.

Briefly, the target torque and the target current of the motor 10 are input from another control device such as a vehicle ECU, not shown in the drawings, via a CAN or the like, whereupon current feedback control is executed using the DC bus voltage information input from the voltage detection unit 24, the information indicating the rotation angle of the motor 10, input from the rotation angle sensor 30, and the motor current information input from the motor current detection unit 26. ON/OFF control signals for the respective switching elements of the power conversion circuit 25 are then calculated so as to obtain the target torque and the target current of the motor 10, whereupon the ON/OFF control signals are output to the power conversion circuit 25. Note that the current feedback control is well known, and therefore detailed description thereof has been omitted here.

When the power supply side abnormality determination unit 62 determines that a power supply side abnormality has occurred, regenerative power cannot be regenerated to the DC power supply 90, and therefore the regeneration abnormality response processing selection unit 63 selects the three-phase short circuit processing or the six-switch opening processing using a method to be described below, and outputs the selection result to the switching control signal generation unit 61 as a regeneration abnormality response processing command.

When the three-phase short circuit processing is input into the switching control signal generation unit 61 from the regeneration abnormality response processing selection unit 63 as the regeneration abnormality response processing command, the switching control signal generation unit 61 outputs ON/OFF control signals to the power conversion circuit 25 so that the upper stage side switching elements 31, 33, 35 are switched ON and the lower stage side switching elements 32, 34, 36 are switched OFF.

Note that when the three-phase short circuit processing is input into the switching control signal generation unit 61 from the regeneration abnormality response processing selection unit 63 as the regeneration abnormality response processing command, the switching control signal generation unit 61 may output ON/OFF control signals to the power conversion circuit 25 so that the upper stage side switching elements 31, 33, 35 are switched OFF and the lower stage side switching elements 32, 34, 36 are switched ON.

Further, when the six-switch opening processing is input into the switching control signal generation unit 61 from the regeneration abnormality response processing selection unit 63 as the regeneration abnormality response processing command, the switching control signal generation unit 61 outputs ON/OFF control signals to the power conversion circuit 25 so that all of the switching elements 31 to 36 are switched OFF.

The method employed by the regeneration abnormality response processing selection unit 63 to generate the regeneration abnormality response processing command when the power supply side abnormality determination unit 62 determines that a power supply side abnormality has occurred will now be described in detail.

Having determined that a power supply side abnormality has occurred, the regeneration abnormality response processing selection unit 63 selects the six-switch opening processing when the rotation speed of the motor 10 is lower than the three-phase short circuit execution rotation speed, the rotation speed of the motor 10 having been calculated from the information indicating the rotation angle of the motor 10, input from the rotation angle sensor 30, and selects the three-phase short circuit processing when the rotation speed of the motor 10 is higher than the three-phase short circuit execution rotation speed. The regeneration abnormality response processing selection unit 63 then generates a regeneration abnormality response processing command.

Here, the three-phase short circuit execution rotation speed is set at the lower limit value of the rotation speed at which the maximum values of the phase currents, which increase upon execution of the three-phase short circuit processing, fall below the overcurrent threshold. Further, the overcurrent threshold is set at a current value not exceeding the withstand currents of the motor 10 and the constituent components of the inverter circuit, or in other words in a similar manner to a typical motor control device.

Moreover, the capacitor 21 is selected so that the maximum value of the capacitor inter-terminal voltage, which increases when the six-switch opening processing is executed at the three-phase short circuit execution rotation speed, falls below the overvoltage threshold. The overvoltage threshold is set at a voltage value not exceeding the withstand voltages of the capacitor 21 and the constituent components of the inverter circuit, or in other words in a similar manner to a typical motor control device. Note that the value of the three-phase short circuit execution rotation speed is determined in advance by experiment or the like, and stored in a memory.

By performing the operation described above, the regeneration abnormality response processing can be selected appropriately in accordance with the rotation speed of the motor 10 when it is determined from the DC bus voltage that regenerative power cannot be regenerated to the DC power supply 90 such that regenerative power cannot be regenerated to the DC power supply 90, and as a result, an increase in the inter-terminal voltage of the capacitor and an increase in the phase currents of the motor 10 can both be suppressed.

More specifically, the six-switch opening processing is implemented in a motor operating condition in which the rotation speed of the motor 10 is low such that the maximum values of the phase currents would increase to the extent that the motor 10 and the constituent components of the inverter circuit may break upon execution of the three-phase short circuit processing, and as a result, breakage of the motor 10 and the constituent components of the inverter circuit due to increased phase currents resulting from execution of the three-phase short circuit processing can be prevented.

Further, the three-phase short circuit processing is implemented in a motor operating condition in which the rotation speed of motor 10 is high such that a large amount of regenerative energy would flow into the capacitor 21 upon execution of the six-switch opening processing, and as a result, breakage of the capacitor 21 and the constituent components of the inverter circuit due to an increased capacitor inter-terminal voltage resulting from execution of the six-switch opening processing can be prevented.

In other words, the motor operating condition in which the six-switch opening processing is executed is limited to a motor operating condition in which the rotation speed of the motor 10 is low enough to ensure that a small amount of regenerative energy flows into the capacitor 21, and therefore the capacitance of the capacitor need only be large enough to withstand a comparatively small amount of inflowing regenerative energy. As a result, a small capacitor can be used.

According to the first embodiment, as described above, in a case where regenerative power cannot be regenerated to the DC power supply 90, the six-switch opening processing is executed in a motor operating condition in which the rotation speed of the motor 10 is low such that the maximum values of the phase currents would be large upon execution of the three-phase short circuit processing, and the three-phase short circuit processing is executed in a motor operating condition in which the rotation speed of the motor 10 is high such that a large amount of regenerative energy would flow into the capacitor 21 upon execution of the six-switch opening processing. Therefore, an increase in the inter-terminal voltage of the capacitor and an increase in the phase currents of the motor 10 can both be suppressed without adding a discharge circuit, and as a result, a small, low-cost motor control device that does not break even when the inverter circuit 20 is disconnected from the DC power supply 90 during a regenerative operation can be realized.

Note that in the first embodiment, the three-phase short circuit execution rotation speed is set at the lower limit value of the rotation speed at which the maximum values of the phase currents, which increase upon execution of the three-phase short circuit processing, fall below the overcurrent threshold, but as long as the maximum value of the capacitor inter-terminal voltage, which increases when the six-switch opening processing is executed at the three-phase short circuit execution rotation speed, falls below the overvoltage threshold, the three-phase short circuit execution rotation speed may be set at a higher rotation speed than the aforesaid lower limit value.

Further, in the first embodiment, the power supply side abnormality determination unit 62 of the switching control unit 60 determines whether or not a power supply side abnormality has occurred on the basis of the DC bus voltage information input from the voltage detection unit 24, but in an alternative configuration, the opening condition of the power switch 70 may be communicated from an external control device such as a vehicle ECU, not shown in the drawings, for example, and a power supply side abnormality may be determined to have occurred when the power switch 70 is open.

Note that any desired elements may be used as the switching elements of the power conversion circuit 25. For example, wide bandgap semiconductors may be used. Wide bandgap semiconductors may be formed from silicon carbide, a gallium nitride-based material, diamond, and so on, for example.

An inverter circuit constituted by switching elements that are formed from wide bandgap semiconductors exhibits higher voltage resistance and lower loss than an inverter circuit constituted by conventional switching elements formed from silicon Si. Hereafter, an inverter circuit constituted by switching elements formed from wide bandgap semiconductors will be referred to as a wide bandgap inverter circuit, and an inverter circuit constituted by switching elements formed from silicon Si will be referred to as an Si inverter circuit.

Since the switching elements of a motor control device employing a wide bandgap inverter circuit exhibit higher voltage resistance than the switching elements of a motor control device employing an Si inverter circuit, a limitation on an upper limit voltage of the inter-terminal voltage of the capacitor due to the switching elements is relaxed, and as a result, the inter-terminal voltage of the capacitor is allowed to increase by a comparatively large amount upon execution of the six-switch opening processing. In other words, the maximum permitted value of the capacitor inter-terminal voltage, which increases when the six-switch opening processing is executed at the three-phase short circuit execution rotation speed, can be set to be comparatively large, and as a result, a capacitor having a small capacitance can be used, enabling a reduction in the size of the capacitor.

Second Embodiment

Figure 3:
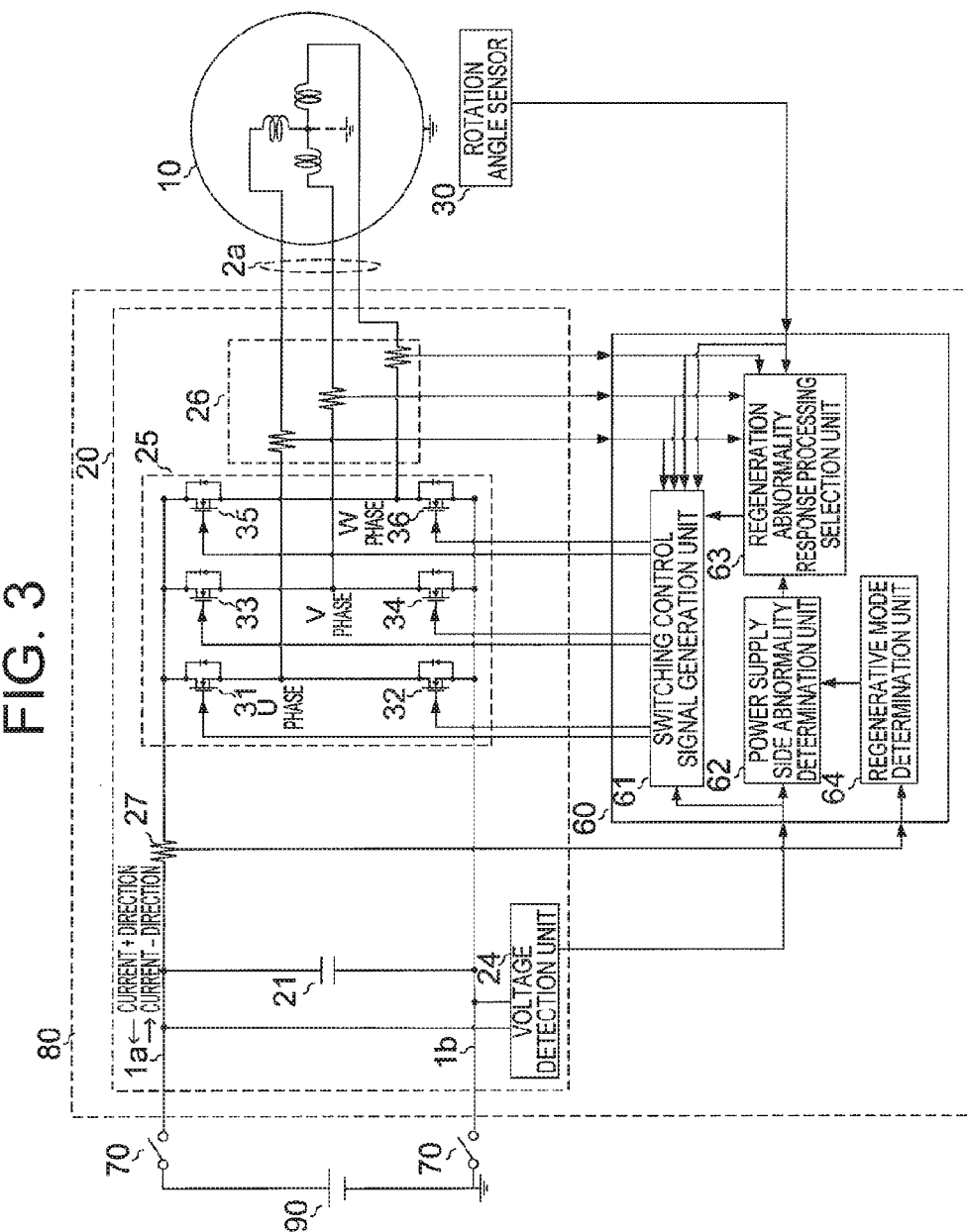
FIG. 3 is a block diagram showing a configuration of a driving system installed with a motor control device according to a second embodiment of this invention.

Next, a motor control device according to a second embodiment of this invention will be described in detail on the basis of FIG. 3. FIG. 3 is a block diagram showing a configuration of a driving system installed with the motor control device according to the second embodiment of this invention. FIG. 3 also shows a DC power supply such as a battery that supplies DC power to an inverter circuit and is charged with regenerative power, and a three-phase synchronous motor serving as a control subject.

In FIG. 3, the motor control device 80 is constituted by the inverter circuit 20 and the switching control unit 60, similarly to the first embodiment, but differs from the first embodiment in that a DC bus current detection unit 27 is added to the inverter circuit 20 and a regenerative mode determination unit 64 is added to the switching control unit 60.

Further, the signals input into the power supply side abnormality determination unit 62 and the regeneration abnormality response processing selection unit 63 differ slightly from the first embodiment. Note that all other configurations are identical to the first embodiment, shown in FIG. 1, and therefore identical or corresponding parts of the drawing have been allocated identical reference numerals to FIG. 1, and description thereof has been omitted.

The DC bus current detection unit 27 detects a DC bus current flowing between the DC power supply 90 and the power conversion circuit 25, converts the detected current into a voltage, and outputs DC bus current information to the switching control unit 60. FIG. 3 shows a configuration in which the current is detected by a shunt resistor. Note that the DC bus current detection unit 27 may be a current sensor that uses a Hall element or the like.

The regenerative mode determination unit 64 determines whether or not the motor 10 is in a regenerative condition on the basis of the DC bus current information input from the DC bus current detection unit 27, and outputs a determination result to the power supply side abnormality determination unit 62 as a regenerative mode determination result.

The power supply side abnormality determination unit 62 determines whether or not a power supply side abnormality has occurred on the basis of the DC bus voltage information input from the voltage detection unit 24 and the regenerative mode determination result input from the regenerative mode determination unit 64, and outputs the determination result to the regeneration abnormality response processing selection unit 63.

Further, the regeneration abnormality response processing selection unit 63 receives the information indicating the rotation angle of the motor 10 from the rotation angle sensor 30, the power supply side abnormality determination result from the power supply side abnormality determination unit 62, and the motor current information from the motor current detection unit 26, and having determined from this input information that a power supply side abnormality has occurred, selects either the three-phase short circuit processing or the six-switch opening processing, and outputs the selection result to the switching control signal generation unit 61 in the form of a regeneration abnormality response processing command.

Here, a feature of the motor control device according to the second embodiment of this invention is that the switching control unit 60 is provided with the regeneration abnormality response processing selection unit 63, and when a power supply side abnormality is determined to have occurred, either the three-phase short circuit processing or the six-switch opening processing is selected and executed on the basis of the information indicating the rotation angle of the motor 10 and the motor current information.

With this configuration, an increase in the inter-terminal voltage of the capacitor and an increase in the phase currents of the motor 10 can both be suppressed even when the inverter circuit 20 is disconnected from the DC power supply 90. This configuration will be described in more detail below together with reasons why an increase in the inter-terminal voltage of the capacitor and an increase in the phase currents of the motor 10 can both be suppressed thereby.

In the first embodiment, as described above, when the inverter circuit 20 is disconnected from the DC power supply 90 and the rotation speed of the motor 10 is high, the increase in the inter-terminal voltage of the capacitor upon execution of the six-switch opening processing becomes greater, but the maximum values of the phase currents upon execution of the three-phase short circuit processing decrease. When the rotation speed of the motor 10 is low, on the other hand, the increase in the inter-terminal voltage of the capacitor upon execution of the six-switch opening processing becomes smaller, but the maximum values of the phase currents upon execution of the three-phase short circuit processing increase.

Further, the maximum values of the phase currents following execution of the three-phase short circuit processing tend to increase as the phase currents flowing through the motor 10 prior to execution of the three-phase short circuit processing increase. In other words, the phase currents prior to the three-phase short circuit processing circulate between the inverter circuit and the motor following execution of the three-phase short circuit processing, and therefore the maximum values of the phase currents following execution of the three-phase short circuit processing increase as the phase currents prior to the execution of the three-phase short circuit processing increase.

Hence, in the motor control device according to the second embodiment of this invention, as described above, the regeneration abnormality response processing selection unit 63 receives the information indicating the rotation angle of the motor 10 from the rotation angle sensor 30, the power supply side abnormality determination result from the power supply side abnormality determination unit 62, and the motor current information from the motor current detection unit 26, and having determined from this input information that a power supply side abnormality has occurred, selects either the three-phase short circuit processing or the six-switch opening processing, and outputs the selection result to the switching control signal generation unit 61 in the form of a regeneration abnormality response processing command.

More specifically, having determined that a power supply side abnormality has occurred, the regeneration abnormality response processing selection unit 63 selects the six-switch opening processing when the rotation speed of the motor 10 is lower than the three-phase short circuit execution rotation speed, the rotation speed of the motor 10 having been calculated from the rotation angle information, and selects the three-phase short circuit processing when the rotation speed of the motor 10 is higher than the three-phase short circuit execution rotation speed.

Here, the three-phase short circuit execution rotation speed is set at the lower limit value of the rotation speed at which the maximum values of the phase currents, which increase upon execution of the three-phase short circuit processing, fall below the overcurrent threshold. Further, the three-phase short circuit execution rotation speed is set in accordance with the magnitudes of the phase currents at the point where the power supply side abnormality determination unit 62 determines that a power supply side abnormality has occurred.

Note that the magnitudes of the phase currents at the point where a power supply side abnormality is determined to have occurred are calculated using the motor current information input from the motor current detection unit 26. Further, the overcurrent threshold is set at a current value not exceeding the withstand currents of the motor 10 and the constituent components of the inverter circuit, or in other words in a similar manner to a typical motor control device.

Moreover, the capacitor 21 is selected so that the maximum value of the capacitor inter-terminal voltage, which increases when the six-switch opening processing is executed at the three-phase short circuit execution rotation speed, falls below the overvoltage threshold. The overvoltage threshold is set at a voltage value not exceeding the withstand voltages of the capacitor 21 and the constituent components of the inverter circuit, or in other words in a similar manner to a typical motor control device.

The switching control signal generation unit 61 is configured identically to the first embodiment, described above, so as to output ON/OFF control signals to the power conversion circuit 25.

According to this configuration, the six-switch opening processing is implemented in a motor operating condition in which the rotation speed of the motor 10 is low such that the maximum values of the phase currents would increase to the extent that the motor 10 and the constituent components of the inverter circuit may break upon execution of the three-phase short circuit processing, and as a result, breakage of the motor 10 and the constituent components of the inverter circuit due to increased phase currents resulting from execution of the three-phase short circuit processing can be prevented.

Further, in a motor operating condition in which the rotation speed of motor 10 is high such that a large amount of regenerative energy would flow into the capacitor 21 upon execution of the six-switch opening processing, the three-phase short circuit processing is implemented, and as a result, breakage of the capacitor 21 and the constituent components of the inverter circuit due to an increased capacitor inter-terminal voltage resulting from execution of the six-switch opening processing can be prevented.

In other words, the motor operating condition in which the six-switch opening processing is executed is limited to a motor operating condition in which the rotation speed of the motor 10 is low enough to ensure that a small amount of regenerative energy flows into the capacitor 21, and therefore the capacitance of the capacitor need only be large enough to withstand a comparatively small amount of inflowing regenerative energy. As a result, a small capacitor can be used.

Furthermore, the three-phase short circuit execution rotation speed is set in accordance with the magnitudes of the phase currents at the point where the power supply side abnormality determination unit 62 determines that a power supply side abnormality has occurred, and therefore the regeneration abnormality response processing can be selected in accordance with more accurate maximum phase current values following execution of the three-phase short circuit processing. As a result, processing corresponding to the motor operating condition can be selected more appropriately.

Next, an operation of the motor control device according to the second embodiment of this invention will be described. First, the regenerative mode determination unit 64 determines whether or not the motor 10 is in the regenerative condition on the basis of the DC bus current input from the DC bus current detection unit 27, and outputs the determination result to the power supply side abnormality determination unit 62 as the regenerative mode determination result. More specifically, when a positive/negative sign of the current is oriented as shown in FIG. 3, the regenerative mode determination unit 64 determines that the motor 10 is in the regenerative condition when the DC bus current is positive, and determines that the motor 10 is in a power running condition when the DC bus current is negative.

Further, the power supply side abnormality determination unit 62 determines whether or not a power supply side abnormality in which regenerative power cannot be regenerated to the DC power supply 90 has occurred on the basis of the DC bus voltage input from the voltage detection unit 24 and the regenerative mode determination result input from the regenerative mode determination unit 64. More specifically, the power supply side abnormality determination unit 62 determines that a power supply side abnormality in which regenerative power cannot be regenerated to the DC power supply 90 has occurred when the DC bus voltage equals or exceeds a predetermined set value and the regenerative mode determination result indicates the regenerative condition, and determines that the power supply side is normal in all other cases.

In so doing, it is possible to determine that a power supply side abnormality has occurred in cases where regenerative power cannot be regenerated to the DC power supply 90, such as a case in which the motor 10 performs a regenerative operation while the power switch 70 is in an open condition such that regenerative power is stored in the capacitor 21, with the result that the end-to-end voltage of the capacitor 21, or in other words the DC bus voltage, reaches a high voltage that would not occur during a normal operation, or a case in which the DC power supply 90 reaches a high voltage that would not occur during a normal operation even though the power switch 70 is in a conductive condition.

When the power supply side abnormality determination unit 62 determines that the power supply side is in a normal condition, the motor 10 can perform the power running operation and the regenerative operation without any problems, and therefore the regeneration abnormality response processing selection unit 63 does not output a regeneration abnormality response processing command to the switching control signal generation unit 61. When a regeneration abnormality response processing command is not input into the switching control signal generation unit 61 from the regeneration abnormality response processing selection unit 63, the switching control signal generation unit 61 executes typical, widely known inverter circuit drive control.

Briefly, the target torque and the target current of the motor 10 are input from another control device such as a vehicle ECU, not shown in the drawings, via a CAN or the like, whereupon current feedback control is executed using the DC bus voltage information input from the voltage detection unit 24, the information indicating the rotation angle of the motor 10, input from the rotation angle sensor 30, and the motor current information input from the motor current detection unit 26. ON/OFF control signals for the respective switching elements of the power conversion circuit 25 are then calculated so as to obtain the target torque and the target current of the motor 10, whereupon the ON/OFF control signals are output to the power conversion circuit 25. Note that the current feedback control is well known, and therefore detailed description thereof has been omitted here.

When the power supply side abnormality determination unit 62 determines that a power supply side abnormality has occurred, regenerative power cannot be regenerated to the DC power supply 90, and therefore the regeneration abnormality response processing selection unit 63 selects the three-phase short circuit processing or the six-switch opening processing using a method to be described below, and outputs the selection result to the switching control signal generation unit 61 as a regeneration abnormality response processing command.

When the three-phase short circuit processing is input into the switching control signal generation unit 61 from the regeneration abnormality response processing selection unit 63 as the regeneration abnormality response processing command, the switching control signal generation unit 61 outputs ON/OFF control signals to the power conversion circuit 25 so that the upper stage side switching elements 31, 33, 35 are switched ON and the lower stage side switching elements 32, 34, 36 are switched OFF.

Note that when the three-phase short circuit processing is input into the switching control signal generation unit 61 from the regeneration abnormality response processing selection unit 63 as the regeneration abnormality response processing command, the switching control signal generation unit 61 may output ON/OFF control signals to the power conversion circuit 25 so that the upper stage side switching elements 31, 33, 35 are switched OFF and the lower stage side switching elements 32, 34, 36 are switched ON.

Further, when the six-switch opening processing is input into the switching control signal generation unit 61 from the regeneration abnormality response processing selection unit 63 as the regeneration abnormality response processing command, the switching control signal generation unit 61 outputs ON/OFF control signals to the power conversion circuit 25 so that all of the switching elements 31 to 36 are switched OFF.

The method employed by the regeneration abnormality response processing selection unit 63 to generate the regeneration abnormality response processing command when the power supply side abnormality determination unit 62 determines that a power supply side abnormality has occurred will now be described in detail.

Having determined that a power supply side abnormality has occurred, the regeneration abnormality response processing selection unit 63 selects the six-switch opening processing when the rotation speed of the motor 10 is lower than the three-phase short circuit execution rotation speed, the rotation speed of the motor 10 having been calculated from the information indicating the rotation angle of the motor 10, input from the rotation angle sensor 30, and selects the three-phase short circuit processing when the rotation speed of the motor 10 is higher than the three-phase short circuit execution rotation speed. The regeneration abnormality response processing selection unit 63 then generates a regeneration abnormality response processing command.

Here, the three-phase short circuit execution rotation speed is set at the lower limit value of the rotation speed at which the maximum values of the phase currents, which increase upon execution of the three-phase short circuit processing, fall below the overcurrent threshold. Further, the three-phase short circuit execution rotation speed is set in accordance with the magnitudes of the phase currents at the point where the power supply side abnormality determination unit 62 determines that a power supply side abnormality has occurred.

Note that the magnitudes of the phase currents at the point where a power supply side abnormality is determined to have occurred are calculated using the motor current information input from the motor current detection unit 26. Further, the overcurrent threshold is set at a current value not exceeding the withstand currents of the motor 10 and the constituent components of the inverter circuit, or in other words in a similar manner to a typical motor control device.

Moreover, the capacitor 21 is selected so that the maximum value of the capacitor inter-terminal voltage, which increases when the six-switch opening processing is executed at the three-phase short circuit execution rotation speed, falls below the overvoltage threshold. The overvoltage threshold is set at a voltage value not exceeding the withstand voltages of the capacitor 21 and the constituent components of the inverter circuit, or in other words in a similar manner to a typical motor control device. Note that the three-phase short circuit execution rotation speed is stored in a memory in the form of a two-dimensional map on which the value thereof, which is determined in advance by experiment or the like, is set in accordance with the phase currents.

In the operation described above, the regenerative condition of the motor 10 is determined from the DC bus current, and when the DC bus voltage equals or exceeds a predetermined set value and the regenerative mode determination result indicates the regenerative condition, it is determined that regenerated power cannot be regenerated to the DC power supply 90. As a result, a condition in which the regeneration abnormality response processing is required can be determined accurately. In other words, the regeneration abnormality response processing is not executed unnecessarily.

Further, in the operation described above, when regenerative power cannot be regenerated to the DC power supply 90, the regeneration abnormality response processing can be selected appropriately in accordance with the rotation speed of the motor 10 and the magnitudes of the phase currents at the point where a power supply side abnormality is determined to have occurred. As a result, an increase in the inter-terminal voltage of the capacitor and an increase in the phase currents of the motor 10 can both be suppressed.

More specifically, the six-switch opening processing is implemented in a motor operating condition in which the rotation speed of the motor 10 is low such that the maximum values of the phase currents would increase to the extent that the motor 10 and the constituent components of the inverter circuit may break upon execution of the three-phase short circuit processing. As a result, breakage of the motor 10 and the constituent components of the inverter circuit due to increased phase currents resulting from execution of the three-phase short circuit processing can be prevented.

Further, in a motor operating condition in which the rotation speed of motor 10 is high such that a large amount of regenerative energy would flow into the capacitor 21 upon execution of the six-switch opening processing, the three-phase short circuit processing is implemented. As a result, breakage of the capacitor 21 and the constituent components of the inverter circuit due to an increased capacitor inter-terminal voltage resulting from execution of the six-switch opening processing can be prevented.

In other words, the motor operating condition in which the six-switch opening processing is executed is limited to a motor operating condition in which the rotation speed of the motor 10 is low enough to ensure that a small amount of regenerative energy flows into the capacitor 21, and therefore the capacitance of the capacitor need only be large enough to withstand a comparatively small amount of inflowing regenerative energy. As a result, a small capacitor can be used.

Further, the three-phase short circuit execution rotation speed is set in accordance with the magnitudes of the phase currents at the point where the power supply side abnormality determination unit 62 determines that a power supply side abnormality has occurred, and therefore the regeneration abnormality response processing can be selected in accordance with more accurate maximum phase current values following execution of the three-phase short circuit processing. As a result, processing corresponding to the motor operating condition can be selected more appropriately.

According to the second embodiment, as described above, when regenerative power cannot be regenerated to the DC power supply 90 and the motor is in the regenerative condition, the six-switch opening processing is executed in a motor operating condition in which the rotation speed of the motor 10 is low such that the maximum values of the phase currents would be large upon execution of the three-phase short circuit processing, and the three-phase short circuit processing is executed in a motor operating condition in which the rotation speed of the motor 10 is high such that a large amount of regenerative energy would flow into the capacitor 21 upon execution of the six-switch opening processing. Therefore, an increase in the inter-terminal voltage of the capacitor and an increase in the phase currents of the motor 10 can both be suppressed without adding a discharge circuit, and as a result, a small, low-cost motor control device that does not break even when the inverter circuit 20 is disconnected from the DC power supply 90 during a regenerative operation can be realized.

Note that in the second embodiment, the three-phase short circuit execution rotation speed is set in accordance with the magnitudes of the phase currents at the point where the power supply side abnormality determination unit 62 determines that a power supply side abnormality has occurred, and the magnitudes of the phase currents at the point where a power supply side abnormality is determined to have occurred are calculated using the motor current information input from the motor current detection unit 26. However, the magnitudes of the phase currents at the point where a power supply side abnormality is determined to have occurred do not necessarily have to be obtained from the motor current detection unit 26.

More specifically, the magnitudes of the phase currents may be calculated using the torque command value and the current command value input in relation to the motor 10 from an external control unit such as a vehicle ECU, not shown in the drawings, for example. In so doing, it is possible to respond to cases in which use of the motor current detection unit 26 is not appropriate, such as a case in which noise is superimposed on the motor current information obtained from the motor current detection unit 26 or a case in which a detection delay time is large.

Note that the first and second embodiments described above are merely examples, and this invention may be applied to other embodiments. For example, in the first and second embodiments, the DC power supply 90 and the motor control device 80 are connected to each other directly, but a DC/DC converter that performs voltage step-up and step-down may be disposed between the DC power supply 90 and the motor control device 80. Alternatively, the DC power supply 90 and the motor control device 80 may be connected to the AC power supply via a rectifier or an AC/DC converter that converts the AC power from the AC power supply into DC power.

Further, in the first and second embodiments, the three-phase short circuit processing is selected as the regeneration abnormality response processing in which regenerative power is not charged to the capacitor 21, but instead, either two of the upper stage side switching elements 31, 33, 35 or two of the lower stage side switching elements 32, 34, 36 may be switched ON in accordance with a driving condition of the motor 10. Furthermore, in the first and second embodiments, the motor is a three-phase synchronous motor, but a motor having two phases, four phases, or more may be used instead.

Moreover, in the first and second embodiments, an electric vehicle is cited as an example, but this invention may also be applied to a hybrid vehicle that employs both an engine and a motor. Furthermore, this invention is not limited to a vehicle.

Embodiments of this invention were described above, but this invention is not limited to the above embodiments, and may be subjected to various design modifications. Moreover, the embodiments may be combined freely and modified or omitted appropriately within the scope of this invention.

What is claimed is:

1. A motor control device that is connected between a DC power supply and an AC motor in order to drive-control the AC motor by converting DC power from the DC power supply into AC power, comprising:
    a power conversion circuit in which an arm of one AC phase is constituted by a series circuit having an upper stage side switching element and a lower stage side switching element;
    a capacitor that smooths a DC side voltage of the power conversion circuit; and
    a switching control unit that ON/OFF-controls the switching elements of the power conversion circuit,
    the switching control unit including:
    a power supply side abnormality determination unit that determines whether or not a power supply side abnormality in which regenerative power from the AC motor cannot be regenerated to the DC power supply has occurred; and
    a regeneration abnormality response processing selection unit that selects either three-phase short circuit processing, in which all of the upper stage side switching elements or all of the lower stage side switching elements are switched ON, or six-switch opening processing, in which all of the switching elements of the power conversion circuit are switched OFF, as processing to be executed when the power supply side abnormality determination unit determines that a power supply side abnormality has occurred, the three-phase short circuit processing and the six-switch opening processing being selected in accordance with a motor operating condition of the AC motor at the time of the determination.

2. The motor control device according to claim 1, further comprising a rotation speed detection unit that detects a rotation speed of the AC motor,
    wherein the regeneration abnormality response processing selection unit selects either the three-phase short circuit processing or the six-switch opening processing as the processing to be executed on the basis of at least the rotation speed of the AC motor.

3. The motor control device according to claim 2, further comprising a phase current detection unit that detects a phase current of the AC motor,
    wherein the regeneration abnormality response processing selection unit selects either the three-phase short circuit processing or the six-switch opening processing as the processing to be executed on the basis of at least the rotation speed and the phase current of the AC motor.

4. The motor control device according to claim 2, wherein the regeneration abnormality response processing selection unit selects the six-switch opening processing when the rotation speed is lower than a three-phase short circuit execution rotation speed, and selects the three-phase short circuit processing when the rotation speed is higher than the three-phase short circuit execution rotation speed.

5. The motor control device according to claim 4, wherein the three-phase short circuit execution rotation speed is set at a rotation speed at which a maximum value of the phase current of the AC motor, which increases upon execution of the three-phase short circuit processing, falls below an overcurrent threshold.

6. The motor control device according to claim 5, wherein the three-phase short circuit execution rotation speed is set at a lower limit value of a rotation speed at which the maximum value of the phase current of the AC motor, which increases upon execution of the three-phase short circuit processing, falls below an overcurrent threshold.

7. The motor control device according to claim 5, wherein the overcurrent threshold is set at a current value not exceeding withstand currents of the AC motor and constituent components of the power conversion circuit.

8. The motor control device according to claim 4, wherein the three-phase short circuit execution rotation speed is set in accordance with a magnitude of the phase current of the AC motor at the point where the power supply side abnormality determination unit determines that a power supply side abnormality has occurred.

9. The motor control device according to claim 4, wherein the capacitor is selected so that a maximum value of a DC bus voltage of the power conversion circuit, which increases when the six-switch opening processing is executed at the three-phase short circuit execution rotation speed, falls below an overvoltage threshold.

10. The motor control device according to claim 9, wherein the overvoltage threshold is set at a voltage value not exceeding withstand voltages of the capacitor and constituent components of the power conversion circuit.

11. The motor control device according to claim 1, wherein the power supply side abnormality determination unit determines that a power supply side abnormality has occurred when the DC bus voltage of the power conversion circuit equals or exceeds a predetermined set value.

12. The motor control device according to claim 1, wherein the switching control unit further includes a regenerative mode determination unit that determines whether or not the AC motor is in a regenerative condition,
    wherein the power supply side abnormality determination unit determines that a power supply side abnormality has occurred when the DC bus voltage of the power conversion circuit equals or exceeds a predetermined set value and the regenerative mode determination unit determines that the AC motor is in the regenerative condition.

13. The motor control device according to claim 1, wherein the regeneration abnormality response processing selection unit selects the six-switch opening processing when a maximum value of the phase current of the AC motor, which increases upon execution of the three-phase short circuit processing, is larger than an overcurrent threshold, and selects the three-phase short circuit processing in all other cases.

14. The motor control device according to claim 1, wherein the switching elements of the power conversion circuit are formed from wide bandgap semiconductors.

15. A motor control method executed by a motor control device that is connected between a DC power supply and an AC motor in order to drive-control the AC motor by converting DC power from the DC power supply into AC power, the motor control device comprising a power conversion circuit in which an arm of one AC phase is constituted by a series circuit having an upper stage side switching element and a lower stage side switching element, and a capacitor that smooths a DC side voltage of the power conversion circuit, the motor control method comprising:

a power supply side abnormality determination step for determining whether or not a power supply side abnormality in which regenerative power from the AC motor cannot be regenerated to the DC power supply has occurred; and a regeneration abnormality response processing selection step for selecting either three-phase short circuit processing, in which all of the upper stage side switching elements or all of the lower stage side switching elements are switched ON, or six-switch opening processing, in which all of the switching elements of the power conversion circuit are switched OFF, as processing to be executed when a power supply side abnormality is determined to have occurred in the power supply side abnormality determination step, the three-phase short circuit processing and the six-switch opening processing being selected in accordance with a motor operating condition of the AC motor at the time of the determination.

* * * * *